April 4, 1939.                G. ANSORGE                2,153,290
                           GARDEN HOSE HOLDER
                    Filed July 25, 1936         2 Sheets—Sheet 1
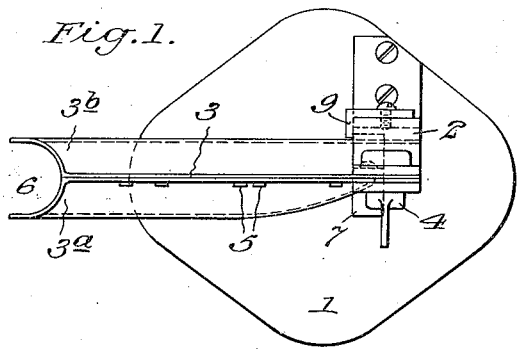
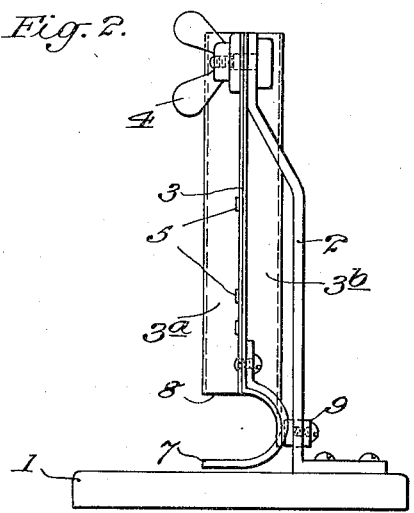
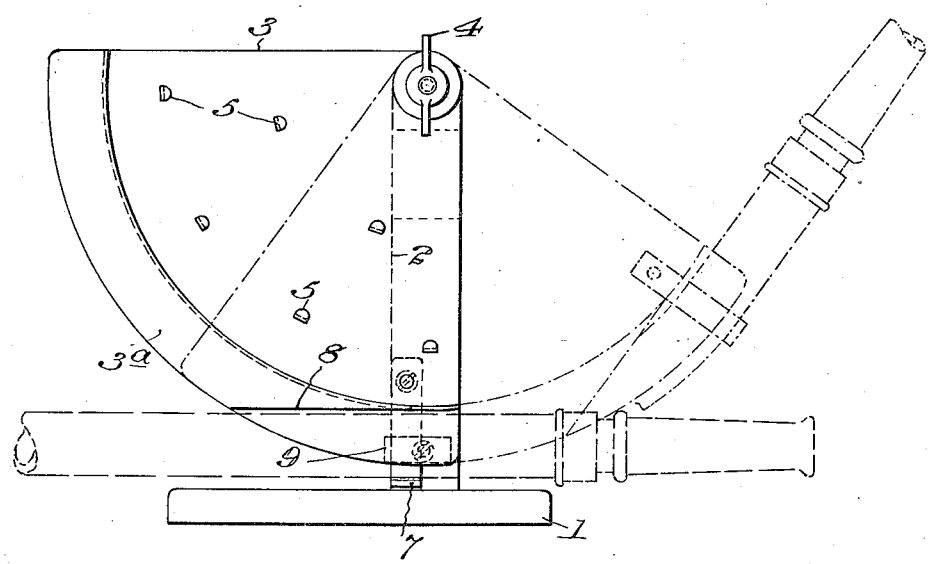
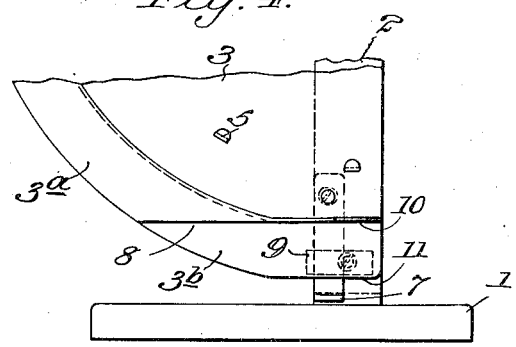
INVENTOR
George Ansorge
BY
ATTORNEYS April 4, 1939.  G. ANSORGE  2,153,290
GARDEN HOSE HOLDER
Filed July 25, 1936  2 Sheets-Sheet 2
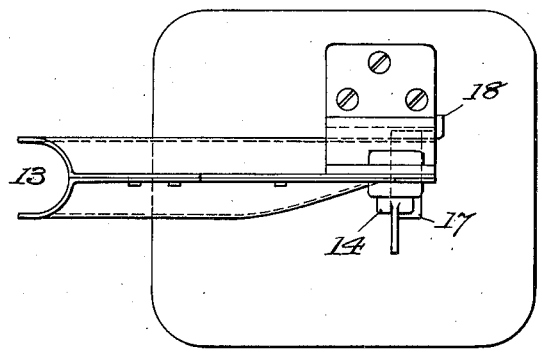
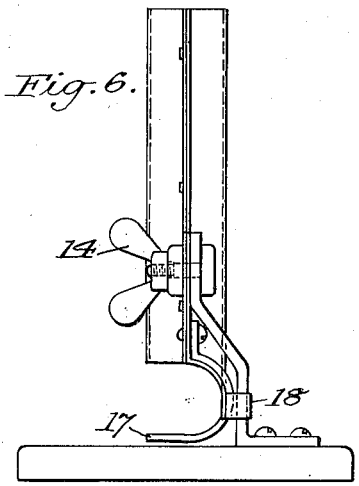
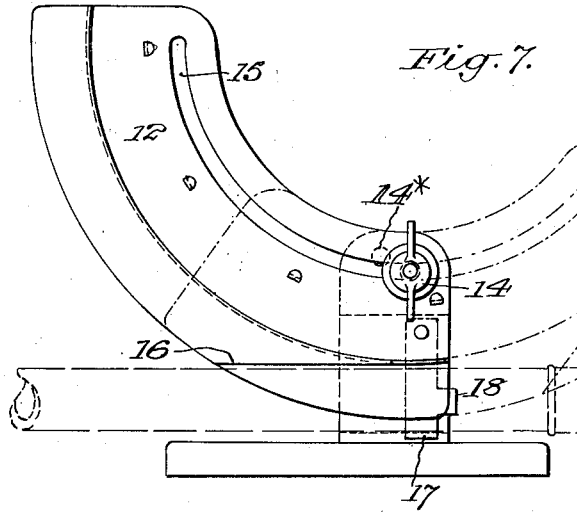
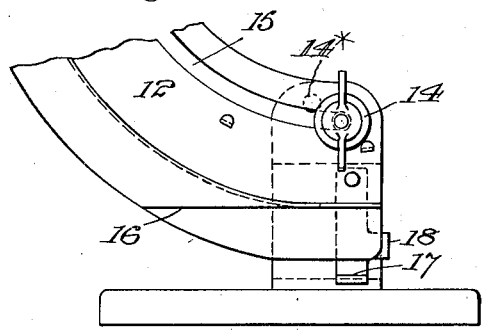
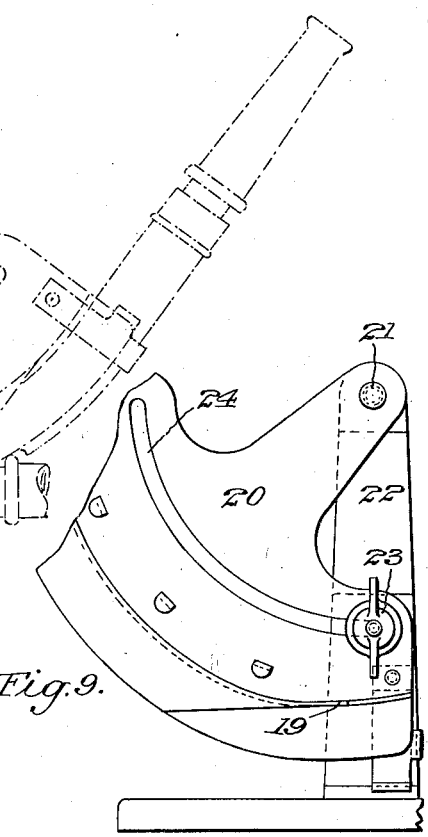
INVENTOR
George Ansorge
BY
ATTORNEY Patented Apr. 4, 1939

2,153,290

UNITED STATES PATENT OFFICE 2,153,290

GARDEN HOSE HOLDER

George Ansorge, Kew Gardens, N. Y.

Application July 25, 1936, Serial No. 92,470

5 Claims. (Cl. 248—82)

This invention relates to a garden hose holder, adapted to hold and support the nozzle end of a garden hose adjustably in various fixed positions.

It is known by those who are familiar with the care and maintenance of gardens and lawns that it is more efficient to sprinkle a garden or lawn with a stream of water from the usual type of adjustable hose nozzle, as compared with the use of a perforated spray or sprinkler. The latter, whether of fixed or revolving type, are generally not adjustable except by varying the water supply at its source. A further disadvantage of the popular types of sprinklers is that they usually are arranged to wet the ground over a circular area in all directions from the sprinkler, hence they cannot be placed conveniently in flower beds and rock gardens or arranged to sprinkle terraces, hedges, bushes, and trees, their use being thus limited chiefly to the sprinkling of lawns. In order to reach effectively the corners of gardens or spaces near fences and buildings, the best type of sprinkling stream is that delivered by the ordinary adjustable hose nozzle from a more or less distant point.

An object of the present invention is to provide a simple and effective support for the nozzle end of a garden hose, in which the stream may be adjusted to any angle from horizontal to vertical, the sprinkled area thus being variable from fan-shape to substantially circular.

A further object is to provide such a garden hose support having a firm and steady base portion which may readily be moved by pulling on the hose, without danger of upsetting.

A further object is to provide certain improvements in the form, construction, arrangement and material of the device whereby the above named and other objects may effectively be attained.

A practical embodiment of the invention is represented in the accompanying drawings, in which Fig. 1 represents, in plan view, one form of the device in position to receive the end of a garden hose;

Fig. 2 represents an end elevation of the device shown in Fig. 1;

Fig. 3 represents a side elevation of the same device having a hose in position thereon, the parts being shown in one suitable operating position in broken lines;

Fig. 4 represents a detail modification of part of the device shown in Fig. 3;

Fig. 5 represents, in plan view, a modified form of the device in position to receive the end of a garden hose;

Fig. 6 represents an end elevation of the device shown in Fig. 5;

Fig. 7 represents a side elevation of the same modified device having a hose in position thereon, the parts being shown in one suitable operating position in broken lines;

Fig. 8 represents a detail modification of part of the device shown in Fig. 7; and Fig. 9 represents, in side elevation, a second modified form of the device combining to some extent the features of the mountings shown in Figs. 1 and 5.

Referring particularly to the device shown in Figs. 1, 2 and 3, there is provided a base plate 1 which should be formed of a heavy material, such as metal, in order to provide a firm and steady base for the device. Secured to the base plate is an upstanding bracket 2 having a quadrant shaped sector 3 pivotally secured to its upper end by means of a bolt and wing nut 4. The sector 3 may economically be made from stamped sheet metal, the two complementary halves 3a and 3b being secured together by means of small tongues 5, or by welding or soldering, as will readily be understood. The two halves of the sector 3 are so shaped as to provide a peripheral channel 6 of a size suitable to accommodate the common sizes of garden hose; and the sector 3 is provided at what may be considered its forward edge, with a finger 7 which passes around one edge of the channel 6 and projects in a direction away from the bracket 2 at such a distance from the base of the channel as to permit the accommodation of the hose between the finger and said base, as clearly shown in Fig. 2. In order to provide for the insertion of the hose into the device, a portion of the sector member 3a is cut away as shown at 8, so that when the parts are in the position shown in Fig. 3, there will be sufficient space to insert the hose between the cutaway edge 8 at the top and the base plate 1 and finger 7 on the bottom. A stop 9 may be provided in order to facilitate adjustment of the parts to the loading position, the stop shown being arranged to engage the vertical part of the finger 7 when the sector is swung to the position shown in Figs. 1, 2 and 3.

After the hose has been inserted in the open part of the channel between the finger 7 and the edge 8, the wing nut 4 is loosened and the sector is swung forward to any desired operating position, such as that shown in broken lines in Fig. 3. In this operating position the main body of the hose will be securely held within the space formed by the channel 6 and the base plate 1, while the natural resiliency of the hose will cause it to rest firmly upon the finger 7 with the nozzle projecting in the desired direction, as shown in Fig. 3.

In some cases it may be desirable to shorten the radius of curvature of the channel 6 adjacent its forward end, as shown at 19 in Fig. 9, or the same effect can be obtained by providing a short straight portion, as shown in Fig. 4, wherein the base 10 and rim 11 of the channel extend straight across for a short distance in the vicinity of the projecting finger 7. This arrangement is intended to provide a maximum amount of space for inserting the hose when the parts are in loading position, while enabling the channel portion to embrace the body of the hose securely as soon as the sector has been turned a slight amount. The relatively sharp bend in the hose at the point where the straight part of the channel joins the curved part will also tend to insure a particularly firm seating of the hose against the finger 7 when the sector is turned to operating position.

The construction and operation of the modified form of the device shown in Figs. 5, 6 and 7 will, in general, be obvious from the foregoing description of the form shown in Figs. 1, 2 and 3. It will be noted that, in the modified form the middle part of the sector has been eliminated to leave a piece 12 in a relatively segmental form. This segment has at its periphery a channel 13, corresponding to the channel 6, and the segment is movable in an arcuate direction around an imaginary center, being guided and secured by a bolt and wing nut 14 which pass through an arcuate slot 15. One side of the channel 13 at its forward end is cut away as shown at 16, in order to permit insertion of the hose above the projecting finger 17 when the parts are in loading position, exactly as above described. In the present case there is shown a slight variation in the form of the stop 18, corresponding to the stop 9 in Figs. 1, 2 and 3, this stop 18 being formed integral with the finger 17. In order to adapt the device to different sized hose a second hole 14* may be provided in the bracket so that the bolt and wing nut 14 may be moved up to provide greater clearance between the channel and the base of the device; in this case it will also be desirable to replace the finger and stop 17—18 with a similar element of somewhat greater length.

In Fig. 8 is shown a modified form of the channel 13, corresponding to the modification shown in Fig. 4, in that the forward end of the channel is straightened out (or might be formed around a shorter radius) in order to improve the hose gripping qualities of the device, as previously explained.

A particularly sturdy arrangement is shown in Fig. 9 where the sector 20 is pivoted at 21 to the upstanding support 22, the sector being secured in desired positions by the bolt and wing nut 23 which pass through an arcuate slot 24. The channel and stop construction is similar to that shown in Figs. 5 to 8.

It will be understood that various changes may be resorted to in the form, construction, arrangement, and material of the several parts without departing from the spirit and scope of my invention, and hence I do not wish to be limited to the particular embodiments herein shown and described except as they may be included in the claims.

What I claim is:

1. A garden hose holder comprising, a base, an upstanding bracket secured to said base, an element having a curved peripheral channel, said element being mounted on said bracket and adapted for arcuate movement, a finger extending across the open portion of said channel adjacent one end thereof, part of the channel wall adjacent said finger being cut away to permit the insertion of a hose between the finger and the channel base and between the holder base and the channel base when said element is in loading position, and the remainder of the channel being adapted to form with the holder base a partly closed space for retaining the hose when the channel is in operating position.

2. A device according to claim 1 in which the element is sector-shaped.

3. A device according to claim 1 in which the element is sector-shaped and is provided with means including an arcuate slot for securing said element in a plurality of adjusted positions.

4. A device according to claim 1 in which the element is segment-shaped.

5. A device according to claim 1 in which the element is segment-shaped and is provided with means including an arcuate slot for securing said element in a plurality of adjusted positions.

GEORGE ANSORGE.